United States Patent [19]

Schriever

[11] Patent Number: 5,298,092
[45] Date of Patent: Mar. 29, 1994

[54] NON-CHROMATED OXIDE COATING FOR ALUMINUM SUBSTRATES

[75] Inventor: Matthias P. Schriever, Kent, Wash.

[73] Assignee: The Boeing Company, Seattle, Wash.

[21] Appl. No.: 525,800

[22] Filed: May 17, 1990

[51] Int. Cl.$^5$ .......................................... C23C 22/56
[52] U.S. Cl. .................................. 148/275; 427/305; 427/435; 427/437; 148/243; 148/274; 148/284; 148/286
[58] Field of Search ................... 427/305, 435, 437; 148/267, 247, 256, 243, 274, 275, 286

[56] References Cited

U.S. PATENT DOCUMENTS

| | | | |
|---|---|---|---|
| 1,551,613 | 9/1925 | Pacz | 148/273 |
| 1,607,676 | 11/1926 | Jirotka | 427/437 |
| 2,796,370 | 6/1957 | Ostrander et al. | 148/268 |
| 2,796,371 | 6/1957 | Ostrander et al. | 148/268 |
| 2,906,009 | 9/1959 | Knoll et al. | 427/435 |
| 3,138,479 | 6/1964 | Foley | 427/305 |
| 3,403,035 | 9/1968 | Schneble et al. | 427/437 |
| 3,423,214 | 1/1969 | Koretzky | 427/437 |
| 3,438,798 | 4/1969 | Baudrand et al. | 427/305 |
| 3,444,007 | 5/1969 | Maurer et al. | 148/273 |
| 3,592,747 | 7/1971 | Cohn | 148/6.27 |
| 3,790,453 | 2/1974 | Wanamaker et al. | 204/37.6 |
| 3,819,424 | 6/1974 | Russell et al. | 148/261 |
| 3,870,607 | 3/1975 | Bardach | 204/15 |
| 3,905,838 | 4/1974 | Ito | 148/6.27 |
| 3,928,237 | 12/1975 | Davis | 502/313 |
| 4,088,486 | 5/1978 | Bissonette | 430/393 |
| 4,150,172 | 4/1979 | Kolk, Jr. | 427/305 |
| 4,208,212 | 6/1980 | Kuzuwata et al. | 148/259 |
| 4,218,240 | 8/1980 | Gingerich et al. | 75/365 |
| 4,233,063 | 11/1980 | Ritsko et al. | 75/374 |
| 4,278,463 | 7/1981 | Vanderpool et al. | 75/353 |
| 4,278,477 | 7/1981 | Reinhold | 106/14.15 |
| 4,337,097 | 6/1982 | Tokumasu et al. | 148/253 |
| 4,348,224 | 9/1982 | Gingerich et al. | 75/353 |
| 4,381,203 | 4/1983 | Reinhold | 148/6.14 R |
| 4,392,920 | 7/1983 | McDonald | 204/37.1 |
| 4,637,374 | 1/1987 | Arai | 126/417 |
| 4,659,605 | 4/1987 | Malic et al. | 427/131 |
| 4,804,407 | 2/1989 | Scheithauer et al. | 75/372 |
| 4,897,129 | 1/1990 | Tuttle, Jr. et al. | 148/256 |

FOREIGN PATENT DOCUMENTS

| | | |
|---|---|---|
| 9376789 | 8/1990 | Australia . |
| 356756 | 7/1990 | European Pat. Off. . |
| 405340A1 | 1/1991 | European Pat. Off. . |
| 0458020 | 11/1991 | European Pat. Off. . |
| 0488430 | 6/1992 | European Pat. Off. . |
| 745704 | 11/1944 | Fed. Rep. of Germany . |
| WO91/11542 | 8/1991 | PCT Int'l Appl. . |
| 953987 | 4/1964 | United Kingdom ................ 427/305 |
| 1345868 | 2/1974 | United Kingdom ................ 427/305 |

OTHER PUBLICATIONS

"Deposition of Nickel and Cobalt by Chemical Reduction", Brenner and Riddell, *Journal of Research of Natl. Bureau of Stnds.*, vol. 39, Nov. 1947.

(List continued on next page.)

Primary Examiner—Shrive Beck
Assistant Examiner—Diana Dudash
Attorney, Agent, or Firm—Paul C. Cullom, Jr.; Bernard A. Donahue

[57] ABSTRACT

(A.) A process for forming a cobalt conversion coating on a metal substrate, thereby imparting corrosion resistance and paint adhesion properties. The invention was developed as a replacement for the prior art chromic acid process. The process includes the steps of: (a) providing a cobalt conversion reaction solution comprising an aqueous, alkaline solution containing a soluble cobalt-III hexacoordinated complex, the concentration of the cobalt-III hexacoordinated complex being from about 0.1 mole per gallon of solution to the saturation limit of the cobalt-III hexacoordinated complex; and (b) contacting the substrate with the aqueous reaction solution for a sufficient amount of time, whereby the cobalt conversion coating is formed. The substrate may be aluminum or aluminum alloy, as well as Cd plating, Zn plating, Zn-Ni plating, and steel. The cobalt-III hexacoordinated complex may be present in the form of $[Co(NH_3)_6]X_3$ wherein X is Cl, Br, $NO_3$, CN, SCN, $Y_3PO_4$, $SO_4$, $C_2H_3O_2$, or $Y_2CO_3$.

51 Claims, 6 Drawing Sheets

OTHER PUBLICATIONS

"Nickel and Cobalt Films", by Samuel Wein; *The Glass Industry*, pp. 22, 23, 35; Jan. 1960.

"Regulating Coercivity of Magnetic Thin Films", Tsu & Sakamoto; IBM Technical Disclosure Bulletin, pp. 52–53, vol. 4, No. 8, Jan. 1962.

European Search Report on Appln. No. EP 91 20 2181 (corr. to U.S. Appln. No. 07/621,132) dated 12 Oct. 1992.

Pascal, "Nouveau Traité de Chimie Minérale", 1959, Masson & Cie, Paris, Fr. vol. XVIII, pp. 680–681: Cobaltnitrites.

English translation of above document.

Chemical Abstracts, voll. 89, 1978, abstract no. 122118c, Complexes of Cobalt containing ammonia or ethylenediamine.

European Search Report on Appln. No. EP 91 20 2515 (corr. to U.S. Appln. No. 07/732,568) dated 9 Oct. 1992.

G. Jander and E. Blasius, Einfuhrung in das anorganisch-chemische Praktikum (1968), pp. 106–107.

Van Nostrand's Scientific Encylopedia (1983), Sixth Edition, vol. I, p. 124, "Ammines".

European Search Report on Application No. EP 91 10 3498 dated Jun. 28, 1991, the Hague.

M. Munakata, "Some New Oxygenated Cobalt Complexes", *Bulletin of the Chemical Society of Japan*, vol. 44, pp. 1791–1796 (1971).

S. Fukuzumi et al., "Activation of Cobalt (III)–Alkyl Bonds Through Interaction with Organic Oxidants . . . ", *Chemistry Letters*, pp. 421–424 (1984).

I. Sasaki et al., "X–Ray and Electrochemical Investigation of a Series of Cobalt Complexes . . . ", *Polyhedron*, vol. 6, pp. 2103–2110 (1987).

NON-CHROMATED OXIDE COATING FOR ALUMINUM SUBSTRATES

BACKGROUND OF THE INVENTION

1) Field of the Invention

This environmental-quality invention is in the field of chemical conversion coatings formed on metal substrates, for example, on aluminum substrates. More particularly, one aspect of the invention is a new type of oxide coating (which I refer to as a "cobalt conversion coating") which is chemically formed on metal substrates. The invention enhances the quality of the environment of mankind by contributing to the maintenance of air and water quality.

2) Description of the Related Art

In general, chemical conversion coatings are formed chemically by causing the surface of the metal to be "converted" into a tightly adherent coating, all or part of which consists of an oxidized form of the substrate metal. Chemical conversion coatings can provide high corrosion resistance as well as strong bonding affinity for paint. The industrial application of paint (organic finishes) to metals generally requires the use of a chemical conversion coating, particularly when the performance demands are high.

Although aluminum protects itself against corrosion by forming a natural oxide coating, the protection is not complete. In the presence of moisture and electrolytes, aluminum alloys, particularly the high-copper 2000-series aluminum alloys, such as alloy 2024-T3, corrode much more rapidly than pure aluminum.

In general, there are two types of processes for treating aluminum to form a beneficial conversion coating. The first is by anodic oxidation (anodization) in which the aluminum component is immersed in a chemical bath, such as a chromic or sulfuric acid bath, and an electric current is passed through the aluminum component and the chemical bath. The resulting conversion coating on the surface of the aluminum component offers resistance to corrosion and a bonding surface for organic finishes.

The second type of process is by chemically producing a conversion coating, which is commonly referred to as a chemical conversion coating, by subjecting the aluminum component to a chemical solution, such as a chromic acid solution, but without using an electric current in the process. The chemical solution may be applied by immersion application, by manual application, or by spray application. The resulting conversion coating on the surface of the aluminum component offers resistance to corrosion and a bonding surface for organic finishes. The present invention relates to this second type of process for producing chemical conversion coatings. The chemical solution may be applied by immersion application, by various types of manual application, or by spray application.

One widely-used chromic acid process for forming chemical conversion coatings on aluminum substrates is described in various embodiments in Ostrander et al. U.S. Pat. No. 2,796,370 and Ostrander et al. U.S. Pat. No. 2,796,371, in military process specification MIL-C-5541, and in Boeing Process Specification BAC 5719. These chromic acid chemical conversion baths contain hexavalent chromium, fluorides, and cyanides, all of which present significant environmental as well as health and safety problems. The constituents of a typical chromic acid conversion bath, such as ALODINE 1200, are as follows: $CrO_3$ - "chromic acid" (hexavalent chromium); NaF - sodium fluoride; $KBF_4$ - potassium tetrafluoroborate; $K_2Fe(CN)_6$ - potassium hexafluorozirconate; $K_3Fe(CN)_6$ - potassium ferricyanide; and, $HNO_3$ - nitric acid (for pH control).

Many aluminum structural parts, as well as Cd plated, Zn plated, Zn-Ni plated, and steel parts, throughout the aircraft and aerospace industry are currently being treated using this chromic acid process technology. Chromic acid conversion films, as formed on aluminum substrates, meet a 168 hours corrosion resistance criterion, but they primarily serve as a surface substrate for paint adhesion. Because of their relative thinness and low coating weights (40-150 milligrams/ft$^2$), chromic acid conversion coatings do not cause a fatigue life reduction in the aluminum structure.

However, environmental regulations in the United States, particularly in California, and in other countries are drastically reducing the allowed levels of hexavalent chromium compounds in effluents and emissions from metal finishing processes. Accordingly, chemical conversion processes employing hexavalent chromium compounds must be replaced. The present invention, which does not employ hexavalent chromium compounds, is intended to replace the previously used chromic acid process for forming conversion coatings on aluminum substrates.

SUMMARY OF THE INVENTION (A.) In one aspect, the invention is a process for forming a cobalt conversion coating on a metal substrate, thereby imparting corrosion resistance and paint adhesion properties. The invention was developed as a replacement for the prior art chromic acid process. The process includes the steps of: (a) providing a cobalt conversion solution comprising an aqueous, alkaline reaction solution containing a soluble cobalt-III hexacoordinated complex, the concentration of the cobalt-III hexacoordinated complex being from about 0.1 mole per gallon of solution to the saturation limit of the cobalt-III hexacoordinated complex; and (b) contacting the substrate with the aqueous reaction solution a sufficient amount of time, whereby the cobalt conversion coating is formed. The substrate may be aluminum or aluminum alloy, as well as Cd plating, Zn plating, Zn-Ni plated, and steel. The cobalt-III hexacoordinated complex may be present in the form of $[Co(NH_3)_6]X_3$ is Cl, Br, $NO_3$, CN, SCN, $Y_3PO_4$, $Y_2SO_4$, $C_2H_3O_2$, or $Y_2CO_3$.

(B.) In another aspect, the invention is a chemical conversion coating solution for producing a cobalt conversion coating on a metal substrate, the solution comprising an aqueous, alkaline reaction solution containing a soluble cobalt-III hexacoordinated complex, the concentration of the cobalt-III hexacoordinated complex being from about 0.1 mole per gallon of solution to the saturation limit of the cobalt-III hexacoordinated complex. The aqueous reaction solution may be prepared by a bath makeup sequence including the steps of: (a) dissolving an ammonium salt; (b) then dissolving a cobalt-II salt; and (c) then adding ammonium hydroxide (ammonia).

(C.) In yet another aspect, the invention is a coated article exhibiting corrosion resistance and paint adhesion properties, the article including: (a) a metal substrate; and (b) a cobalt conversion coating formed on the substrate, the cobalt conversion coating including aluminum oxide $Al_2O_3$ as the largest volume percent, and cobalt oxides $CoO$, $Co_3O_4$, and $Co_2O_3$.

BRIEF DESCRIPTION OF THE DRAWINGS

The figures herein are photomicrographs of images produced by a scanning electron microscope of coatings on aluminum alloy test panels. FIGS. 1, 2, 3, and 4 show a cobalt conversion coating 10 formed by a 10 minute immersion in a typical cobalt coating solution. FIGS. 5, 6, 7, and 8 show a cobalt conversion coating 50 formed by a 15 minute immersion in a typical cobalt coating solution. There does not appear to be any significant difference between coating 10 and coating 50.

FIG. 1 is a photomicrograph at X10,000 magnification of a test panel showing a cobalt conversion coating 10 of the invention. The photomicrograph is a top view, from an elevated angle, of the upper surface of oxide coating 10. The top of oxide coating 10 is porous and looks like a layer of chow mein noodles. This test panel was immersed in the cobalt conversion coating solution for 10 minutes. The white bar is a length of 1 micron. The roundish objects indicated by reference numeral 12 are unidentified impurities on the surface of the oxide coating.

FIG. 2 is a photomicrograph at X50,000 magnification of the test panel of FIG. 1. The photomicrograph is a top view, from an elevated angle, of the upper surface of oxide coating 10. FIG. 2 is a close-up, at higher magnification, of a small area of FIG. 1. The white bar is a length of 1 micron.

FIG. 3 is a photomicrograph at X10,000 magnification of another test panel showing a side view of a fractured cross section of a cobalt conversion coating 10 of the invention. The fractured cross section of the aluminum substrate of the test panel is indicated by reference numeral 32. This test panel was immersed in the coating bath for 10 minutes. To make the photomicrograph, the test panel was bent and broken off to expose a cross section of oxide coating 10. The white bar is a length of 1 micron.

FIG. 4 is a photomicrograph at X50,000 magnification of the test panel of FIG. 3 showing a side view of a fractured cross section of cobalt conversion coating 10 of the invention. FIG. 4 is a close-up, at higher magnification, of a small area of FIG. 3. The cross section of oxide coating 10 looks like the side wall of a glacier. The aluminum substrate of the test panel is indicated by reference numeral 32. The white bar is a length of 1 micron. Oxide coating 10 has a vertical thickness of about 0.4-0.6 micron.

FIG. 5 is a photomicrograph at X10,000 magnification of another test panel showing another cobalt conversion coating 50 of the invention. The photomicrograph is a top view, from an elevated angle, of the upper surface of oxide coating 50. The top of oxide coating 50 is porous and looks like a layer of chow mein noodles. This test panel was immersed in the cobalt conversion coating solution for 15 minutes. The white bar is a length of 1 micron. The roundish objects 52 are unidentified impurities on the surface of oxide coating 50.

FIG. 6 is a photomicrograph at X50,000 magnification of the test panel of FIG. 5. The photomicrograph is a top view, from an elevated angle, of the upper surface of oxide coating 50. FIG. 6 is a close-up, at higher magnification, of a small area of FIG. 5. The white bar is a length of 1 micron.

FIG. 7 is a photomicrograph at X10,000 magnification of another test panel showing a side view of a fractured cross section of cobalt conversion coating 50 of the invention. The aluminum substrate of the test panel is indicated by reference numeral 72. This test panel was immersed in the coating bath for 15 minutes. To make the photomicrograph, the test panel was bent and broken off to expose a cross section of oxide coating 50. The white bar is a length of 1 micron.

FIG. 8 is a photomicrograph at X50,000 magnification of the test panel of FIG. 7 showing a side view of a fractured cross section of cobalt conversion coating 50 of the invention. FIG. 8 is a close-up, at higher magnification, of a small area of FIG. 7. The exposed side of oxide coating 50 looks like the wall of a glacier. The aluminum substrate of the test panel is indicated by reference numeral 72. The white bar is a length of 1 micron. Oxide coating 50 has a vertical thickness of about 0.4-0.6 micron.

FIG. 9 is a photomicrograph at X10000 magnification of another aluminum test panel showing a chromic acid conversion coating 90 made by the prior art ALODINE 1200 process. The photomicrograph is a top view, from an elevated angle, of the upper surface of chromic acid conversion coating 90. Coating 90 is characterized by the numerous fissures or channels that are visible in FIG. 9. The white bar is a length of 1 micron.

FIG. 10 is a photomicrograph at X50,000 magnification of the test panel of FIG. 9. It is a top view, from an elevated angle, of the upper surface of conversion coating 90. FIG. 10 is a close-up view, at higher magnification, of a small area of FIG. 9. The white bar is a length of 1 micron.

FIG. 11 is a photomicrograph at X10,000 magnification of another test panel showing chromic acid conversion coating 90 made by the prior art ALODINE 1200 process. FIG. 11 is a side view, from a slightly elevated angle, of a fractured cross section of the chromic acid conversion coating 90. The aluminum substrate of the test panel is indicated by reference numeral 112. To make this photomicrograph, the test panel was bent and broken off to expose a cross section of conversion coating 90. The white bar is a length of 1 micron.

FIG. 12 is a photomicrograph at X50,000 magnification of the test panel of FIG. 11 showing a side view, taken from a slightly elevated angle, of the fractured cross section of the conversion coating 90. FIG. 12 is a close-up, at higher magnification, of a small area of FIG. 11. The aluminum substrate is 112. The exposed side of conversion coating 90 looks like a smooth wall. The white bar is a length of 1 micron. Chromic acid conversion coating 90 has a vertical thickness of about 0.2 micron.

DESCRIPTION OF THE PREFERRED EMBODIMENTS

Figure 1:
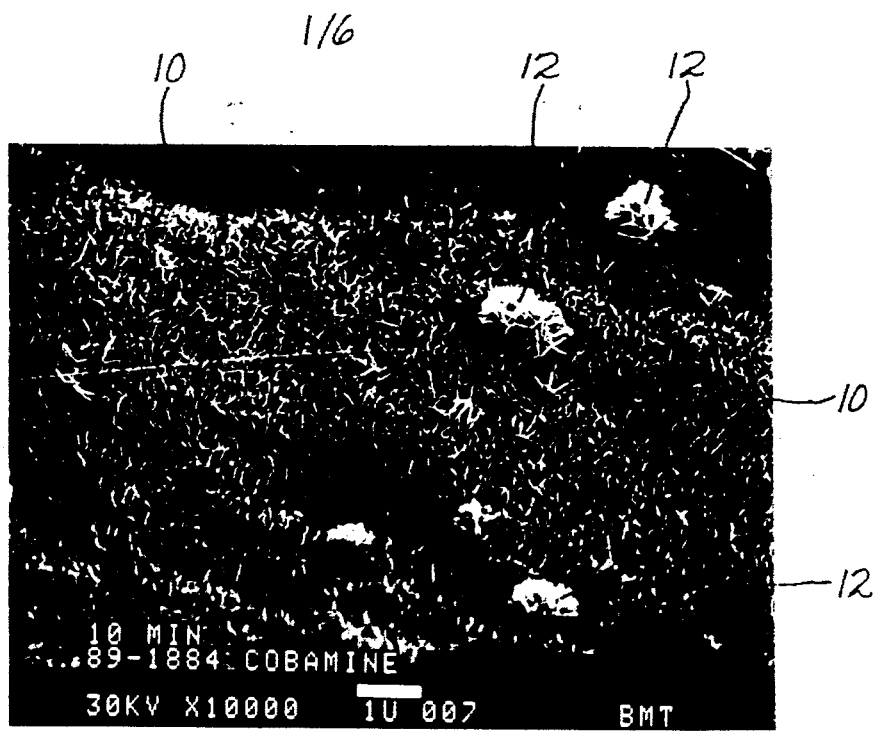
FIGS. 1, 2, 3, 4, 5, 6, 7 and 8 are photomicrographs (scanning electron microscope operated at 30 KV) of alloy 2024-T3 test panels with cobalt conversion coatings made by the invention.
Figure 2:
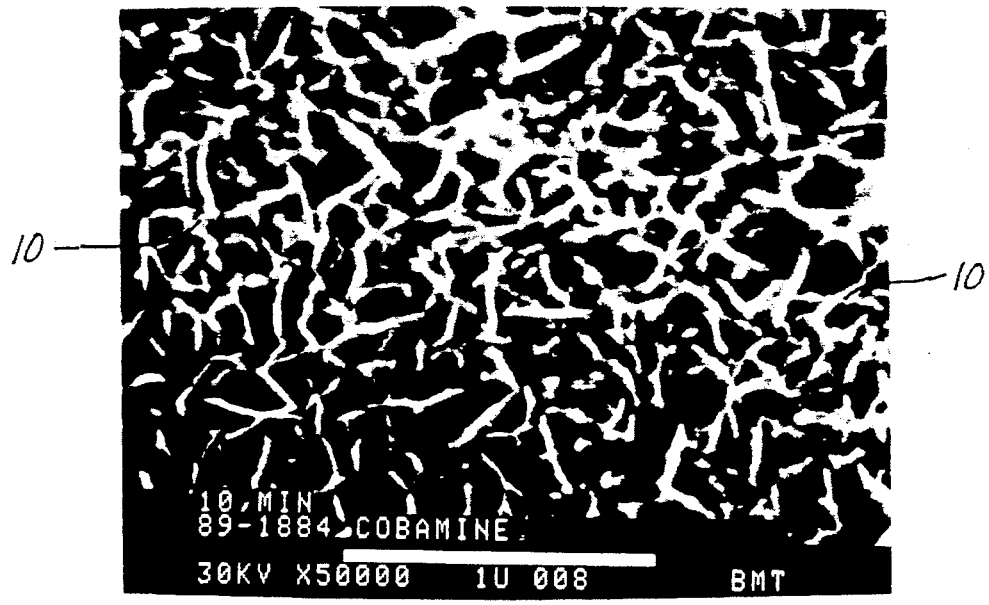
Figure 3:

A considerable amount of empirical research was conducted in order to arrive at the present invention. A variety of multivalent compounds was investigated, used either by themselves or in combination with alkalies, acids, or fluorides. Among these compounds were vanadates, molybdates, cerates, ferrates and a variety of borates. While film deposition of compounds containing these elements on aluminum alloy substrates has been achieved, none afforded any appreciable corrosion protection nor paint adhesion.

A significant increase in corrosion protection was observed, however, when aluminum substrates were immersed in aqueous solutions of simple cobalt-II ($Co^{2+}$) salts heated to 180° F. This led to an investigation of a number of cobalt-II and cobalt-III ($Co^{3+}$) reactions, in particular as described below.

When a stream of air is drawn for several hours through an aqueous solution containing a cobalt-II salt, such as $CoX_2$ (where X=Cl, Br, $NO_3$, CN, SCN, $Y_2 \cdot PO_4$, $Y_2SO_4$, $C_2H_3O_2$, $Y_2CO_3$), and the corresponding ammonium salt $NH_4X$, in the presence of ammonium hydroxide (ammonia) and charcoal (as catalyst), then a cobalt-III hexammine coordination complex is obtained. For example,

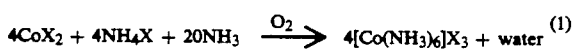

$$4CoX_2 + 4NH_4X + 20NH_3 \xrightarrow{O_2} 4[Co(NH_3)_6]X_3 + \text{water} \quad (1)$$

If the above reaction is carried out in the absence of activated charcoal, the reaction takes a longer time to produce the cobalt-III complex in equation (1) and initially produces an intermediate cobalt-II complex ion:

$$[Co(NH_3)_5X]^{2+} \quad (2)$$

An important aspect of cobalt chemical reactions is the fact that cobalt-II complexes have a strong tendency to oxidize to cobalt-III complexes, i.e.,

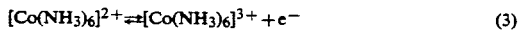

$$[Co(NH_3)_6]^{2+} \rightleftharpoons [Co(NH_3)_6]^{3+} + e^- \quad (3)$$

It was discovered that when aluminum alloy substrates (such as alloy 2024-T3) are immersed in the above aqueous solution of reaction (1) containing the cobalt-III complex, bright iridescent coatings are formed on the aluminum alloy, which give excellent corrosion resistance properties.

The above cobalt complexes are not new. Typical use of cobalt-III complexes is made in the photo development industry as oxidizers to enhance the clarity of color photography. For example, Bissonette U.S. Pat. No. 4,088,486 teaches this photographic use of cobalt-III ammine complexes.

However, it is surprising that these reaction solutions containing cobalt-III hexammine complexes are capable of forming oxide structures on aluminum substrates. The exact reaction mechanism of the oxide formation is not completely understood at this time; while not desiring to be bound by a particular theory, the oxide formation is believed to function on the chemical equilibrium (3) shown above. The oxidizing ability of the cobalt-III hexammine complex is believed to be responsible for the formation of the observed oxide films (which I refer to as "cobalt conversion coatings") on aluminum substrates. The formation of oxide structures has been confirmed by instrumental analysis (Auger analysis and electron microscopy) of the coating. The photomicrographs in FIGS. 1-8 illustrate the appearance of the cobalt conversion coating of the invention.

Initial bath formulations were made up using the following chemicals: $CoCl_2 \cdot 6H_2O$; $NH_4Cl$; and $NH_4OH$ (ammonia). Reaction quantities were used in accordance with stoichiometric balances as shown:

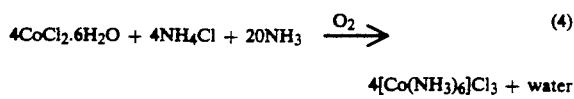

$$4CoCl_2 \cdot 6H_2O + 4NH_4Cl + 20NH_3 \xrightarrow{O_2} \quad (4)$$

$$4[Co(NH_3)_6]Cl_3 + \text{water}$$

Activated charcoal (catalyst) was not used as it presented significant bath purity problems.

It became apparent during experimentation with this initial formulation that a number of parameters are important from the standpoint of bath chemistry and uniform formation of oxide coating films. Some of these parameters are: chemical reactant selection; chemical reactant concentrations; bath makeup sequence; pH control; temperature; and immersion time.

Chemical Reactant Selection

Regarding reactant selection, a wide variety of cobalt salts and ammonium salts are operable for cobalt complexing. Among the other cobalt-II salts which are operable in water solution are cobaltous cyanide dihydrate $Co(CN)_2 \cdot 2H_2O$, cobaltous thiocyanate $Co(SCN)_2 \cdot 3H_2O$, cobaltous orthophosphate $Co_3(PO_4)_2$, cobaltous sulfate $CoSO_4$, cobaltous acetate $Co(C_2H_3O_2)_2 \cdot 4H_2O$, and cobaltous basic carbonate $2CoCO_3 \cdot Co(OH)_2 \cdot H_2O$. Each of the foregoing cobalt-II salts may be reacted with its corresponding ammonium salt and ammonium hydroxide (ammonia). From an environmental standpoint, the cyanide and thiocyanate salts are not preferred.

Furthermore, other cobalt-II salts may be used if they possess a minimum solubility in water or in a water solution containing the corresponding ammonium salt and ammonium hydroxide (ammonia).

Moreover, if the minimum solubility of the cobalt-II salt is sufficient, it is not necessary to use the ammonium salt that corresponds to the cobalt salt, e.g., other ammonium salts may be used such as $NH_4Cl$, $NH_4NO_3$, $(NH_4)_2CO_3$, $NH_4SCN$. Also, the water solution may employ a combination of ammonium salts (see Example 5 below).

It may also be noted that the preferred ammonium salts are $NH_4NO_3$ and $(NH_4)_2CO_3$, or a combination thereof, since cobalt salts to have a strong reaction affinity for nitrates and carbonates.

Chemical Reactant Concentration, pH Control, Temperature, And Immersion Time With respect to chemical reactant concentrations, the concentration of dissolved cobalt-II salt used may be from about 0.1 moles per gallon of final solution up to the saturation limit of the cobalt-II salt employed. The concentration of dissolved ammonium salt may be from about 0.6 to 12 moles per gallon of final solution. The concentration of ammonium hydroxide (ammonia) may be from about 1 to 8 moles of $NH_3$ per gallon of final solution; a stoichiometric excess of ammonium hydroxide (ammonia) is preferred. The pH of the bath may be from about 7.5 to 9.5. The temperature of the bath may be from about 68° F. to 150° F.; above 150° F. gradual decomposition of the cobalt-III hexammine complex occurs. The immersion time may be from about 3 minutes to 60 minutes.

Preferred Bath Preparation Sequence

1. A stainless steel tank fitted with air agitation plumbing and heating coils is filled to 3/4 with deionized water at room temperature 68° F. (20° C.). Air agitation is commenced to a gentle bubble. (The tank may be equipped with a filter unit to remove any solid impurities (dust, aluminum silt, etc.) during processing.)

2. A quantity of the ammonium salt is added and completely dissolved. The amount used is determined by the prime objective. If the prime objective is for the oxide coating to exhibit high corrosion resistance, the preferred molar ratio of ammonium salt to cobalt salt is about 8 to 1 and the preferred concentration of ammonium salt is about 2.4 moles per gallon of final solution. Or if the prime objective is for the oxide coating to exhibit high paint adhesion, the preferred molar ratio of ammonium salt to cobalt salt is about 12 to 1 and the preferred concentration of ammonium salt is about 3.6 moles per gallon of final solution.

3. The cobalt-II salt is now added and dissolved. The preferred concentration is about 0.3 moles per gallon of final solution. Thus, when the prime objective is high corrosion resistance, this concentration of the cobalt salt, when added to a solution already containing 2.4 moles per gallon of the ammonium salt, achieves the preferred molar ratio of ammonium salt to cobalt salt of about 8 to 1. Or when the prime objective is high paint adhesion, this concentration of the cobalt salt, when added to a solution already containing 3.6 moles per gallon of the ammonium salt, achieves the preferred molar ratio of ammonium salt to cobalt salt of 12 to 1. Air bubbling is maintained.

4. A stoichiometric excess of ammonium hydroxide $NH_4OH$ (ammonia) is now added with air agitation. Preferably, 250–300 ml of ammonium hydroxide (28–30% wt. $NH_3$) per gallon of final solution is added; this is a concentration of about 3.5–4.4 moles of $NH_3$ per gallon of final solution. A precipitate may form depending on the concentration of ammonium salt being used, but the precipitate will gradually dissolve as the cobalt-II complex and the cobalt-III complex in equilibrium equation (3) above are formed.

5. The tank is filled to the final volume with deionized water. Air agitation of this solution is maintained for 2–3 hours at room temperature and then the solution is heated to preferably 145°±5° F.

6. The solution is maintained at preferably 145°±5° F. for at least an additional 2 hrs. to allow the cobalt complexing reaction (e.g., equations (1) and (4) above) to make a minimum operable amount of the cobalt-III complex, which is indicated by a burgundy or purple/red color in the solution. Preferably, the solution is maintained at 145°±5° F. for an additional 8 hrs. to make a larger amount of the cobalt-III complex to facilitate efficient practice of the cobalt conversion coating process.

7. Optionally, a second stainless steel tank (to be used for a silicate immersion step) is prepared with air agitation plumbing and heating coils and is filled ¾ with deionized water. This post-cobalt conversion coating step serves as a paint adhesion promoter. The tank is heated to 120°–140° F. with air agitating.

8. The preferred amount of sodium meta-silicate $Na_2SiO_3.9H_2O$ (about 0.28–0.35 moles per gallon of final solution) is added and dissolved. The tank is then filled to final volume with deionized water. No further air agitation is needed.

A substantial amount of sludge may be created in the tank if the above makeup sequence is not employed:

Preferred Overall Processing Sequence

The preferred overall processing sequence for formation of cobalt conversion coatings, meeting the performance criteria of MIL-C-5541 and BAC 5719, is as described below.

The overall processing sequence is: (1) vapor degrease (for example, according to Boeing Process Specification BAC 5408); (2) alkaline clean (for example, according to Boeing Process Specification BAC 5749); (3) rinse at room temperature; (4) deoxidize (for example, according to Boeing Process Specification BAC 5765); (5) rinse at room temperature; (6) form oxide coating according to the present invention (preferably for 5–10 minutes at 120°–150° F.); (7) (optional) silicate immersion treat (preferably for 3 minutes at 120°–140° F.); (8) rinse at room temperature; and (9) dry (do not exceed 140° F.).

The preferred overall processing sequence may be summarized as follows:

| PROCESS SEQUENCE FLOWCHART |
|---|
| (1) VAPOR DEGREASE - BAC 5408 |
| (2) ALKALINE CLEAN - BAC 5749 |
| (3) RINSE - ROOM TEMP. |
| (4) DEOXIDIZE - BAC 5765 |
| (5) RINSE - ROOM TEMP. |
| (6) FORM OXIDE COATING - 5-10 MIN. AT 135 ± 15° F. |
| (7) RINSE - ROOM TEMP. |
| (8) SILICATE IMMERSION 130 ± 10° F. - 3 MIN. MINIMUM |
| (9) RINSE - ROOM TEMP. |
| (10) DRY - DO NOT EXCEED 140° F. |

Examples of specific solution formulations within the scope of the invention are as follows:

EXAMPLE 1

| Component | Make-Up Per Gallon Of Final Solution | Control Limits |
|---|---|---|
| Cobalt(ous) nitrate $Co(NO_3)_2.6H_2O$ (hexahydrate)(about 0.29 mole) | 85 gm | |
| Ammonium nitrate $NH_4NO_3$ (about 2.32 moles) | 186 gm | |
| Ammonium hydroxide $NH_4OH$ (28–30% wt. $NH_3$)(about 3.5–4.4 moles of $NH_3$) | 250–300 ml | |
| Water | balance | |
| Temperature | | 120–150° F. |
| pH | | 8.0–9.0 |

The formulation of Example 1, with a molar ratio of ammonium salt to cobalt salt of about 8 to 1, is useful for producing oxide coatings exhibiting high corrosion resistance.

EXAMPLE 2

| Component | Make-Up Per Gallon Of Final Solution | Control Limits |
|---|---|---|
| Cobalt(ous) chloride $CoCl_2.6H_2O$ (hexahydrate)(about 0.29 mole) | 69 gm | |
| Ammonium nitrate $NH_4NO_3$ (about 2.32 moles) | 186 gm | |
| Ammonium hydroxide $NH_4OH$ (28–30% wt. $NH_3$)(about 3.5–4.4 moles of $NH_3$) | 250–300 ml | |
| Water | balance | |

| Component | Make-Up Per Gallon Of Final Solution | Control Limits |
|---|---|---|
| Temperature | | 120–150° F. |
| pH | | 8.0–9.0 |

The formulation of Example 2, also having a molar ratio of ammonium salt to cobalt salt of about 8 to 1, is useful for producing oxide coatings possessing high corrosion resistance.

When the molar ratio of ammonium salt to cobalt salt is increased (for example, to about 12 to 1 or 13 to 1), then oxide coatings exhibiting high paint adhesion are obtained. This, however, is accomplished with some reduction in corrosion resistance, i.e., 168 hrs. corrosion resistance testing produces marginal results.

A specific formulation, having an ammonium salt to cobalt salt molar ratio of about 13.3 to 1, is as follows:

EXAMPLE 3

| Component | Make-Up Per Gallon Of Final Solution | Control Limits |
|---|---|---|
| Cobalt(ous) nitrate Co(NO$_3$)$_2$.6H$_2$O (about 0.29 mole) | 85 gm | |
| Ammonium carbonate (NH$_4$)$_2$CO$_3$ (about 3.87 moles) | 372 gm | |
| Ammonium hydroxide NH$_4$OH (28–30% wt. NH$_3$)(about 3.5–4.4 moles of NH$_3$) | 250–300 ml | |
| Water | balance | |
| Temperature | | 120–150° F. |
| pH | | 8.0–9.0 |

The formulation of Example 3, with a molar ratio of ammonium salt to cobalt salt of about 13.3 to 1, is useful for producing oxide coatings exhibiting high paint adhesion.

Another specific formulation, having an ammonium salt to cobalt salt molar ratio of about 13.3 to 1, is as follows:

EXAMPLE 4

| Component | Make-Up Per Gallon Of Final Solution | Control Limits |
|---|---|---|
| Cobalt(ous) chloride CoCl$_2$.6H$_2$O (about 0.29 mole) | 69 gm | |
| Ammonium carbonate (NH$_4$)$_2$CO$_3$ (about 3.87 moles) | 372 gm | |
| Ammonium hydroxide NH$_4$OH (28–30% wt. NH$_3$)(about 3.5–4.4 moles of NH$_3$) | 250–300 ml | |
| Water | balance | |
| Temperature | | 120–150° F. |
| pH | | 8.0–9.0 |

The formulation of Example 4, with a molar ratio of ammonium salt to cobalt salt of about 13.3 to 1, is useful for producing oxide coatings exhibiting high paint adhesion.

In summary, Examples 1 and 2 represent formulations for obtaining oxide coatings possessing high corrosion resistance, while Examples 3 and 4 represent formulations for obtaining oxide coatings possessing high paint adhesion.

Another formulation (Example 5 below), having a molar ratio of ammonium salt to cobalt salt of about 14.7 to 1, produces oxide conversion coatings meeting the 168 hours corrosion resistance requirement of MIL-C-5541 as well as showing superior paint adhesion properties over conventional conversion coatings made by the chromic acid process:

EXAMPLE 5

| Component | Make-Up Per Gallon Of Final Solution | Control Limits |
|---|---|---|
| Cobalt(ous) nitrate Co(NO$_3$)$_2$.6H$_2$O (about 0.29 mole) or | 85 gm | |
| Cobalt(ous) chloride CoCl$_2$.6H$_2$O (about 0.29 mole) | 69 gm | |
| Ammonium carbonate (NH$_4$)$_2$CO$_3$ (about 0.97 mole) | 93 gm | |
| Ammonium nitrate NH$_4$NO$_3$ (about 1.16 moles) | 93 gm | |
| Ammonium hydroxide NH$_4$OH (28–30% wt. NH$_3$)(about 3.5–4.4 moles of NH$_3$) | 250 to 300 ml | |
| Ammonium nitrate NH$_4$NO$_3$ (about 0.97 mole) (after initial reaction) | 93 gm | |
| Ammonium carbonate (NH$_4$)$_2$CO$_3$ (about 1.16 moles) (after initial reaction) | 93 gm | |
| Water | balance | |
| Temperature | | 120–150° F. |
| pH | | 8.0–9.0 |

The solution of Example 5, having a molar ratio of ammonium salt to cobalt salt of about 14.7 to 1, produces oxide coatings on alloy 2024-T3 panels having passing results on the corrosion resistance test of MIL-C-5541 and passing results on the paint adhesion test of BMS 10-11 and BMS 10-60. The paint adhesion test results were comparable to paint adhesion test results achieved by chromic acid conversion coatings, which pass the corrosion resistance test of MIL-C-5541. Example 5 also illustrates the use of a combination of ammonium salts and the concept of adding the ammonium salt in two steps, the second step being after the ammonium hydroxide, in the sequence shown.

As mentioned above, an optional procedure may be used to enhance paint adhesion performance when formulations similar to Examples 1 and 2 are used. Water-soluble silicates, such as sodium meta-silicate and potassium meta-silicate, have been found to be particularly effective as paint adhesion promoters when used in a post-conversion coating step (step 8 in the Process Sequence Flowchart above).

Tank makeup and controls are as follows:

EXAMPLE 6

| Component | Make-Up Per Gallon Of Final Solution | Control Limits |
|---|---|---|
| Sodium meta-silicate Na$_2$SiO$_3$.9H$_2$O | 95 gm (about 0.33 mole) | 80–100 gm/gal (about 0.28–0.35 mole) |
| Water | balance | |
| Temperature | | 120–140° F. | pH Control, Temperature, And Time

The three parameters of pH control, temperature, and immersion time have been found to be important as relating to cobalt conversion coating performance.

Preferred pH control is maintained between pH 8.0 to 9.0. This pH range is maintained with periodic small additions of $NH_4OH$ or $NH_4CO_3$. At a pH above 9.0, corrosion resistance performance will decrease rapidly, while paint adhesion remains high. Coatings tend to lose their colored iridescence to approach nearly-colorless resistance performance with a decrease in paint adhesion performance.

Below pH 7.5, coating iridescence also disappears and a brown "stain coat" forms instead. This brown deposit possesses neither corrosion resistance nor acceptable paint adhesion properties.

Bath temperature was originally kept between 65° to 85° F. This was done in the early stages of development and resulted in acceptable oxide coats. However, a continuous operating range of 120° to 150° F. gives optimum results with respect to coating appearance and performance.

Immersion times tend to be influenced by temperature control rather than solution concentration. At room temperature (68° F.), immersion times of 15 to 20 minutes are required for satisfactory conversion coating formation. At elevated temperatures (120° to 150° F.), consistent and well functioning conversion coatings are produced within 5 to 10 minutes.

Corrosion Resistance

Salt spray corrosion resistance of cobalt conversion coatings produced by the above processes varies over a wide range, depending on reactant selection, pH, and immersion times. Preferred results are obtained, however, when formulations similar to Examples 1 and 2 are utilized at immersion times of 10-15 minutes. In this way, oxide coatings have been produced with 200 hrs. of salt spray corrosion resistance when tested in accordance with the method of ASTM B117.

Paint Adhesion

Paint adhesion tests were conducted using aircraft paints qualified to Boeing Material Specification BMS 10-11 (a highly crosslinked epoxy primer) and BMS 10-60 (a highly crosslinked urethane topcoat). General trends observed with the present cobalt conversion coatings are consistent with conventional chromic acid conversion coatings, i.e., corrosion resistance and paint adhesion performance properties have an inverse relationship. In general, where corrosion resistance is at a maximum, paint adhesion is at a minimum, and vice versa.

However, the post-conversion step consisting of immersion into a heated solution (at 120°-140° F.) of sodium meta-silicate $Na_2SiO_3.9H_2O$ (Example 6 above) solves this problem by obtaining strop paint adhesion values while maintaining high corrosion resistance properties. Table I below is presented to demonstrate the trend line behavior between corrosion resistance and paint adhesion properties as a function of solution formulation variation.

TABLE I

| FORMULATION 1/ (Co = cobalt salt) | CORROSION RESISTANCE 2/ | PAINT ADHESION 3/ |
|---|---|---|
| A) 12 $NH_4NO_3$/1 Co | Very Low | Very High |
| B) 12 $(NH_4)_2CO_3$/1 Co | Low | High |
| C) 8 $(NH_4)_2CO_3$/1 Co | Medium | Medium |
| D) 8 $(NH_4)_2CO_3$/1 Co; Silicate | Medium | High |
| E) 8 $NH_4NO_3$/1 Co; Silicate | High | High |
| F) 8 $NH_4NO_3$/1 Co | High | Low |
| G) 6 $NH_4NO_3$/1 Co | Low | Very Low |
| H) 6 $(NH_4)_2CO_3$/1 Co | Low | High |

1/ Solution formulations represent molar weight ratios utilizing $NH_4NO_3$ or $(NH_4)_2CO_3$ (as shown), and $Co(NO_3)_2.6H_2O$ or $CoCl_2.6H_2O$. Molar ratios are based on using 85 grams (3 oz.) of cobalt salt per gallon of final solution.
2/ Testing performed in accordance with ASTM B117.
3/ Paint adhesion tests consisted of: (a) wet and dry adhesion; (b) impact resistance testing after 30 days of condensing humidity exposure. Testing performed according to Boeing Material Specifications BMS 10-11 and BMS 10-60. Applied paints were high performance aircraft coatings qualified to Boeing BMS 10-11 and BMS 10-60.

Oxide Coating Analyses

ESCA surface analysis, using a Perkin-Elmer Model 550 surface analyzer, and Auger oxide profiles, using the same machine (in a different operating mode), have been performed in order to characterize the cobalt conversion coatings of the invention. (ESCA = electron spectroscopy for chemical analysis (also known as XPS or X-ray photoelectron spectroscopy).) These analyses show that the cobalt conversion coating consists of a mixture of oxides, namely, aluminum oxide $Al_2O_3$ as the largest volume percent, and cobalt oxides $CoO$, $Co_3O_4$, and $Co_2O_3$. The term "largest volume percent" means that the volume of this oxide exceeds the volume of any other oxide which is present, but the term "largest volume percent" does not necessarily imply that the volume of this oxide is more than 50 volume percent.

The data further shows that in the lower portion of the oxide coating (that is, next to the aluminum substrate), the largest volume percent is $Al_2O_3$. The middle portion of the oxide coating is a mixture of $CoO$, $Co_3O_4$, $Co_2O_3$, and $Al_2O_3$. And the data shows that in the top portion of the oxide coating, the largest volume percent is a mixture of $Co_3O_4$ and $Co_2O_3$.

Figure 4:
Figure 5:
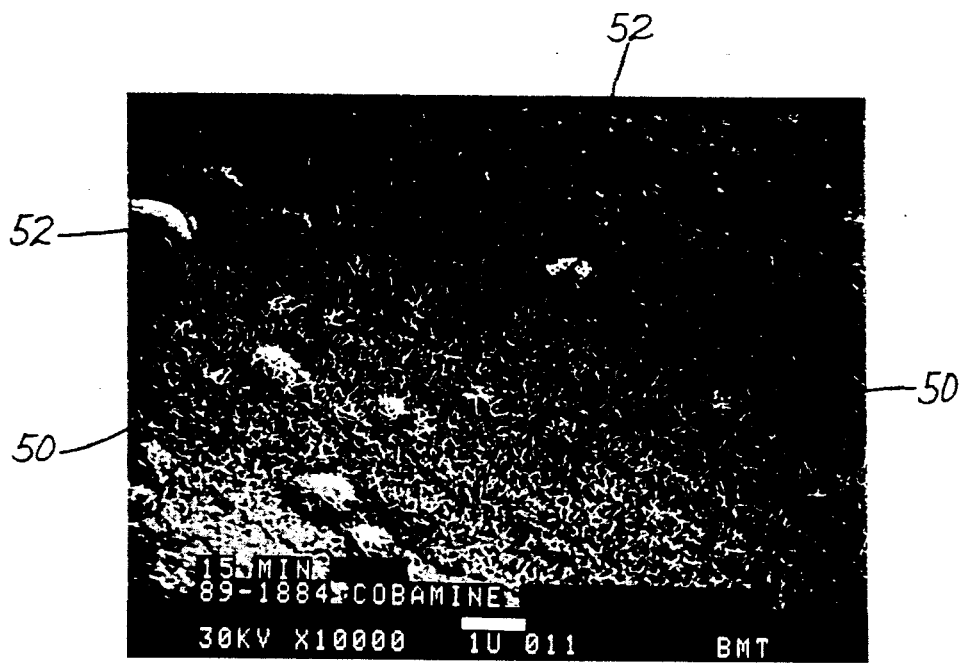
Figure 6:
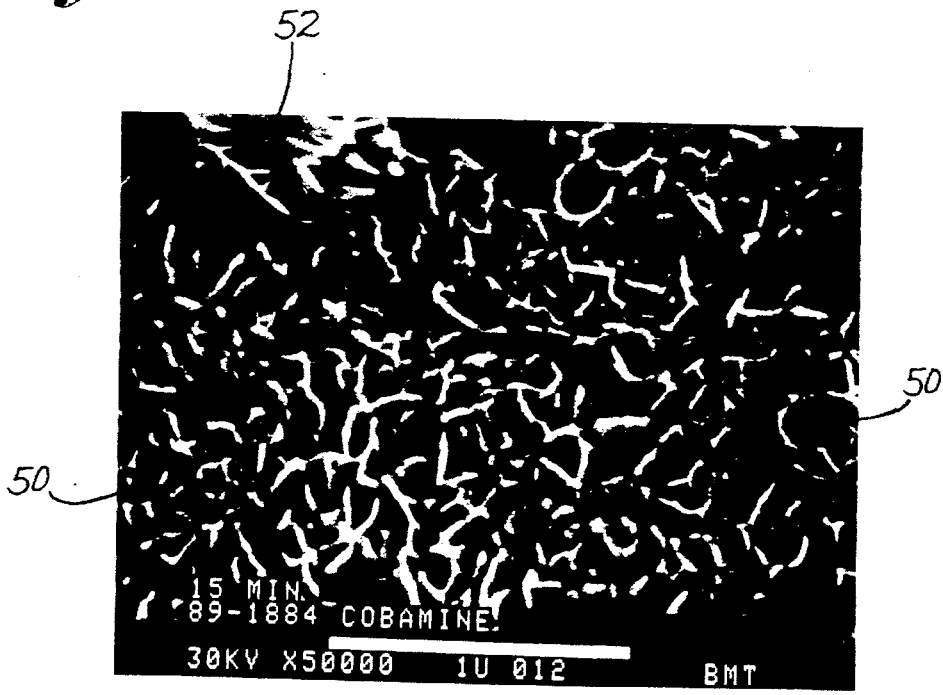
Figure 7:
Figure 8:
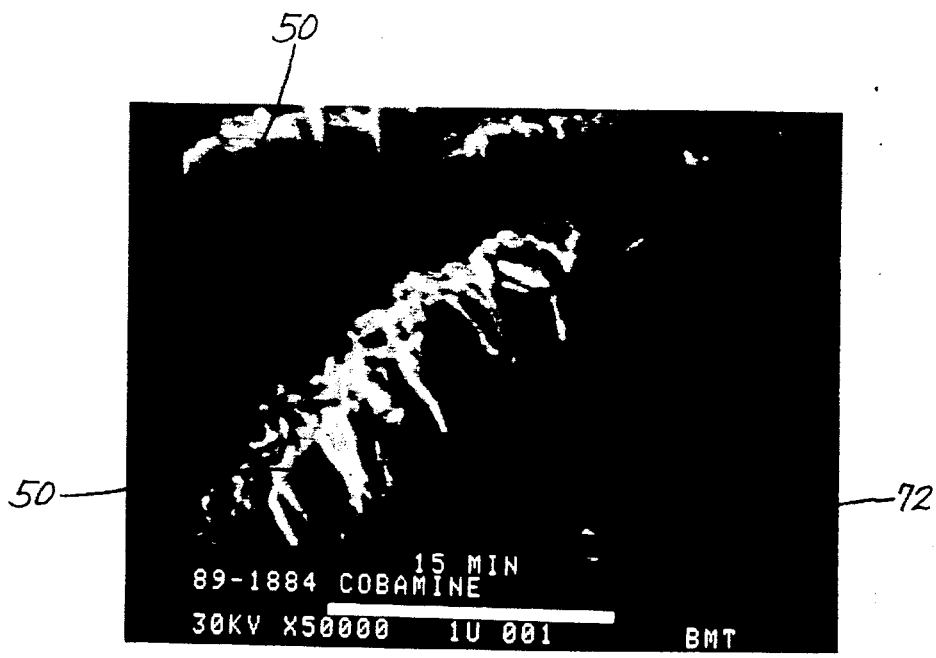
Figure 9:
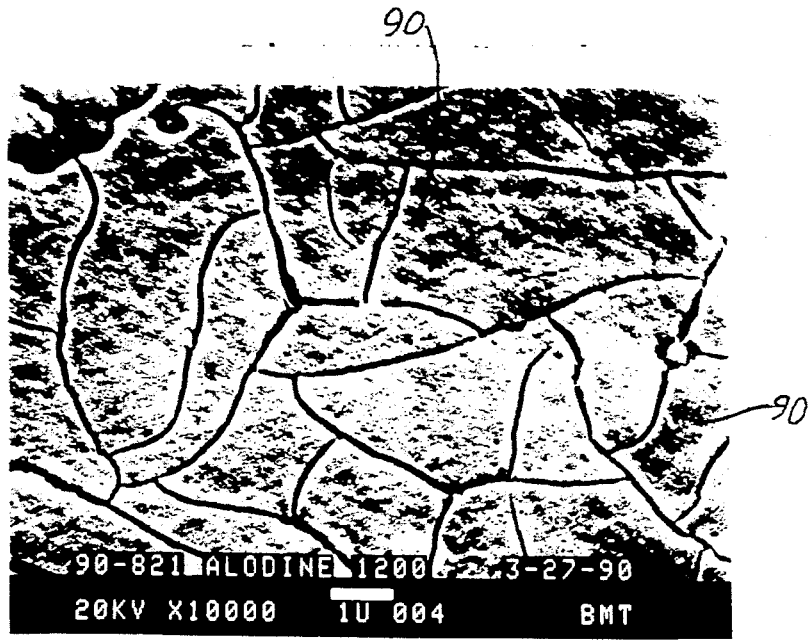
FIGS. 9, 10, 11, and 12 are photomicrographs (scanning electron microscope operated at 20 KV) of alloy 2024-T3 test panels with chromic acid conversion coatings made by the prior art ALODINE 1200 process, which are shown for comparison.
Figure 10:
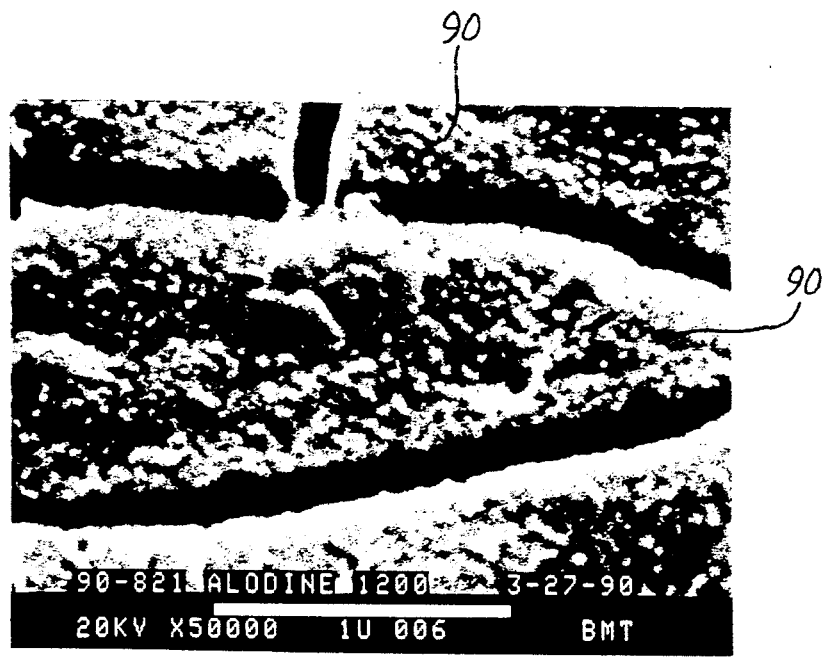
Figure 11:
Figure 12:

Additional characterization of the cobalt conversion coatings of the invention may be found in FIGS. 1-8 and in the descriptions of FIGS. 1-8 above. FIGS. 1-4 show a cobalt conversion coating 10 formed by a 10 minute immersion in a typical cobalt conversion coating solution. FIGS. 5-8 show a cobalt conversion coating 50 formed by a 15 minute immersion in a typical cobalt conversion coating solution. Comparing FIGS. 1-4 and FIGS. 5-8, there does not appear to be any significant structural difference between coating 10 and coating 50. The top surface of the cobalt conversion coating, as shown in FIGS. 1, 2, 5, and 6, bears a resemblance to chow mein noodles, thus providing appreciable surface area and porosity for good paint adhesion. Below the top surface, the coating becomes more dense and solid (non-porous), as shown by FIG. 4.

Other Methods Of Application

The above examples illustrate producing cobalt conversion coatings by immersion application. The same principles apply to producing the conversion coating by manual application and by spray application.

The patents, specifications, and other publications referenced above are incorporated herein by reference.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process for forming an oxide film cobalt conversion coating exhibiting corrosion resistance and paint adhesion properties on a metal substrate, said process comprising the steps of:
   (a) providing an oxide film forming cobalt conversion solution comprising an aqueous, alkaline reaction solution comprising a soluble cobalt-III hexammine complex, where said cobalt-III hexammine complex is present in the form of $(Co(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and where said cobalt-III hexammine complex is made by reacting
      (1) a cobalt-II salt $CoX_2$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
      (2) an ammonium salt $NH_4X$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
      (3) ammonium hydroxide (ammonia),
   such that the concentration of said cobalt-III hexammine complex is from about 0.1 mole per liter of said aqueous reaction solution up to the saturation limit of said cobalt-III hexammine complex; and
   (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

2. The process of claim 1 wherein said aqueous reaction solution has a pH of about 7.5 to 9.5.

3. The process of claim 1 wherein said aqueous reaction solution has a temperature of about 68° F. to 150° F.

4. The process of claim 1 wherein said substrate is contacted with said aqueous reaction solution for a time of about 3 minutes to 60 minutes.

5. A process for forming an oxide film cobalt conversion coating exhibiting corrosion resistance and paint adhesion properties on a substrate, wherein said substrate is aluminum or aluminum alloy, said process comprising the steps of:
   (a) providing an oxide film forming cobalt conversion solution comprising an aqueous reaction solution prepared by
      (1) preparing cobalt-II hexammine complex by reacting a cobalt-II salt with an ammonium salt and ammonium hydroxide, wherein the concentration of said cobalt-II salt is from about 0.1 moles per gallon said aqueous reaction solution to the saturation limit of the cobalt-II salt employed, the concentration of said ammonium salt is from about 0.6 to 12 moles per gallon of said aqueous reaction solution, and the concentration of ammonium hydroxide (ammonia) is from about 1 to 8 moles of $NH_3$ per gallon of said aqueous reaction solution; and
      (2) oxidizing said cobalt-II hexammine complex to form cobalt-III hexammine complex having a concentration of at least 0.1 mole per gallon of said aqueous reaction solution; and
   (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

6. The process of claim 5 wherein said cobalt-II salt is $CoX_2$ wherein X is one or more selected from the group consisting of Cl, Br, $NO_3$, CN, SCN, $Y_3PO_4$, $Y_2SO_4$, $C_2H_3O_2$, or $Y_2CO_3$.

7. The process of claim 5 wherein said ammonium salt is $NH_4X$ wherein X is one or more selected from the group consisting of Cl, Br, $NO_3$, CN, SCN, $Y_3PO_4$, $Y_2SO_4$, $C_2H_3O_2$, or $Y_2CO_3$.

8. The process of claim 5 wherein said aqueous reaction solution is prepared by a bath makeup sequence comprising:
   (a) dissolving said ammonium salt;
   (b) then dissolving said cobalt-II salt; and
   (c) then adding ammonium hydroxide (ammonia).

9. The process of claim 5 wherein said aqueous reaction solution is prepared by reacting said cobalt-II salt with said ammonium salt and ammonium hydroxide (ammonia), wherein the molar ratio of ammonium salt to cobalt salt is about 8 to 1 to 14.7 to 1.

10. The process of claim 5 wherein said aqueous reaction solution has a pH of about 7.5 to 9.5.

11. The process of claim 5 wherein said aqueous reaction solution has a temperature of about 68° F. to 150° F.

12. The process of claim 5 wherein said substrate is contacted with said aqueous reaction solution for a time of about 3 minutes to 60 minutes.

13. The process of claim 5 comprising the additional step of contacting for a minimum time of 3 minutes said substrate having said cobalt conversion coating with an aqueous silicate solution comprising a silicate selected from the group consisting of sodium metasilicate and potassium metasilicate, wherein said silicate has a concentration of about 0.28–0.35 moles per gallon of said aqueous reaction solution and silicate said aqueous silicate solution has a temperature of 120° to 140° F.

14. A process for forming an oxide film cobalt conversion coating exhibiting corrosion resistance and paint adhesion properties on a metal substrate, wherein said substrate is selected from the group consisting of aluminum, aluminum alloy, Cd plating, Zn plating, Zn-Ni plating, and steel, said process comprising the steps of:
   (a) providing an oxide film forming cobalt conversion solution comprising an aqueous, alkaline reaction solution comprising a soluble cobalt-III hexammine complex, where said cobalt-III hexammine complex is present in the form of $(Co(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and where said cobalt-III hexammine complex is made by reacting
      (1) a cobalt-II salt $CoX_2$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and (2) an ammonium salt $NH_4X$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and (3) ammonium hydroxide (ammonia), such that the concentration of said cobalt-III hexammine complex is from about 0.1 mole per liter of said aqueous reaction solution up to the saturation limit of said cobalt-III hexammine complex; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

15. The process of claim 14 wherein said aqueous reaction solution has a pH of about 7.5 to 9.5

16. The process of claim 14 wherein said aqueous reaction solution has a temperature of about 68° F. to 150° F.

17. The process of claim 14 wherein said substrate is contacted with said aqueous reaction solution for a time of about 3 minutes to 60 minutes.

18. A process for forming an oxide film cobalt conversion coating exhibiting corrosion resistance and paint adhesion properties on a metal substrate, wherein said substrate is selected from the group consisting of aluminum, aluminum alloy, Cd plating Zn plating, Zn-Ni plating, and steel, said process comprising the steps of:

(a) providing an oxide film forming cobalt conversion solution comprising an aqueous reaction solution prepared by (1) preparing cobalt-II hexammine complex by reacting a cobalt-II salt with an ammonium salt and ammonium hydroxide (ammonia), wherein the concentration of said cobalt-II salt is from about 0.1 moles per gallon of said aqueous reaction solution to the saturation limit of the cobalt-II salt employed, the concentration of said ammonium salt is from about 0.6 to 12 moles per gallon of said aqueous reaction solution, and the concentration of ammonium hydroxide (ammonia) is from about 1 to 8 moles of $NH_3$ per gallon of said aqueous reaction solution; and (2) oxidizing said cobalt-II hexammine complex to form a soluble cobalt-III hexammine complex having a concentration of at least 0.1 mole per gallon of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

19. The process of claim 18 wherein said cobalt-II salt is $CoX_2$ wherein X is one or more selected from the group consisting of Cl, Br, $NO_3$, CN, SCN, $Y_3PO_4$, $Y_2SO_4$, $C_2H_3O_2$, or $Y_2CO_3$.

20. The process of claim 16 wherein said ammonium salt is $NH_4X$ wherein X is one or more selected from the group consisting of Cl, Br, $NO_3$, CN, SCN, $Y_3PO_4$, $Y_2SO_4$, $C_2H_3O_2$, or $Y_2CO_3$.

21. The process of claim 18 wherein said aqueous reaction solution is prepared by a bath makeup sequence comprising:

(a) dissolving said ammonium salt;
(b) then dissolving said cobalt-II salt; and
(c) then adding ammonium hydroxide (ammonia).

22. The process of claim 18 wherein said aqueous reaction solution is prepared by reacting said cobalt-II salt with said ammonium salt and ammonium hydroxide (ammonia), wherein the molar ratio of ammonium salt to cobalt salt is about 8 to 1 to about 14.7 to 1.

23. The process of claim 18 wherein said aqueous reaction solution has a pH of about 7.5 to 9.5.

24. The process of claim 18 wherein said aqueous reaction solution has a temperature of about 68° F. to 150° F.

25. The process of claim 18 wherein said substrate is contacted with said aqueous reaction solution for a time of about 3 minutes to 60 minutes.

26. A process of forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by (1) preparing cobalt-II hexammine complex by reacting a cobalt-II salt with an ammonium salt and ammonium hydroxide (ammonia), wherein said cobalt-II salt is either cobaltous nitrate or cobaltous chloride, the concentration of said cobalt-II salt is about 0.29 mole per gallon of said aqueous reaction solution, wherein said ammonium salt is ammonium nitrate, the concentration of said ammonium salt is about 2.32 moles per gallon of said aqueous reaction solution, the concentration of ammonium hydroxide (ammonia) is from about 3.5 to 4.4 moles of $NH_3$ per gallon of said aqueous reaction solution, the temperature of said aqueous reaction solution is 120° to 150° F., and the pH of said aqueous reaction solution is 8.0 to 9.0; and (2) oxidizing said cobalt-II hexammine complex to form cobalt-III hexammine complex having a concentration of at least 0.1 mole per gallon of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

27. A process for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by (1) preparing cobalt-II hexammine complex by reacting a cobalt-II salt with an ammonium salt and ammonium hydroxide (ammonia), wherein said cobalt-II salt is either cobaltous nitrate or cobaltous chloride, the concentration of said cobalt-II salt is about 0.29 mole per gallon of said aqueous reaction solution, wherein said ammonium salt is ammonium carbonate, the concentration of said ammonium salt is about 3.87 moles per gallon of said aqueous reaction solution, the concentration of ammonium hydroxide (ammonia) is from about 3.5 to 4.4 moles of $NH_3$ per gallon of said aqueous reaction solution, the temperature of said aqueous reaction solution is 120° to 150° F., and the pH of said solution is 8.0 to 9.0; and (2) oxidizing said cobalt-II hexammine complex to form cobalt-III hexammine complex having a concentration of at least 0.1 mole per gallon of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

28. A process for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by reacting
(1) a cobalt-II salt $CoX_2$, where X is selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
(2) an ammonium salt $NH_4X$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
(3) ammonium hydroxide (ammonia), such that the concentration of said cobalt-II salt is from about 0.1 mole per liter of said aqueous reaction solution up to the saturation limit of said cobalt-II salt, the concentration of said ammonium salt is from about 0.6 to 12 moles per gallon said aqueous reaction solution, and the concentration of said ammonium hydroxide (ammonia) is from about 1 to 8 moles per gallon of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

29. The process of claim 28 wherein air is passed through said aqueous reaction solution to oxidize the cobalt-II ions in solution to cobalt-II ions.

30. The process of claim 28 wherein said aqueous reaction solution is prepared by a bath makeup sequence comprising:
(a) dissolving said ammonium salt;
(b) then dissolving said cobalt-II salt; and
(c) then adding ammonium hydroxide (ammonia).

31. The process of claim 28 wherein said aqueous reaction solution is prepared by reacting said cobalt-II salt with said ammonium salt and ammonium hydroxide (ammonia), wherein the molar ratio of ammonium salt to cobalt salt is about 8 to 1 to 14.7 to 1.

32. The process of claim 28 wherein said aqueous reaction solution has a pH of about 7.5 to 9.5.

33. The process of claim 28 wherein said aqueous reaction solution has a temperature of about 68° F. to 150° F.

34. The process of claim 28 wherein said substrate is contacted with said aqueous reaction solution for a time of about 3 minutes to 60 minutes.

35. The process of claim 28 comprising the additional step of contacting for a minimum time of 3 minutes said substrate having said cobalt conversion coating with an aqueous silicate solution comprising a silicate selected from the group consisting of sodium meta-silicate and potassium meta-silicate, wherein said silicate has a concentration of about 0.28–0.35 moles per gallon of said aqueous silicate solution and said aqueous silicate solution has a temperature of 120°–140° F.

36. A process for forming an oxide film cobalt conversion coating exhibiting corrosion resistance and paint adhesion properties on a metal substrate, said process comprising the steps of:

(a) providing an oxide film forming cobalt conversion solution comprising an aqueous reaction solution prepared by reacting
(1) a cobalt-II salt $CoX_2$, where X is selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
(2) an ammonium salt $NH_4X$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
(3) ammonium hydroxide (ammonia), such that the concentration of said cobalt-II salt is from about 0.1 mole per liter of said aqueous reaction solution up to the saturation limit of said cobalt-II salt, the concentration of said ammonium salt is from about 0.6 to 12 moles per gallon of said aqueous reaction solution, and the concentration of said ammonium hydroxide (ammonia) is from about 1 to 8 moles per gallon of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

37. The process of claim 36 wherein air is passed through said aqueous reaction solution to oxidize the cobalt-II ions in solution to cobalt-III ions.

38. The process of claim 36 wherein said aqueous reaction solution is prepared by a bath makeup sequence comprising:
(a) dissolving said ammonium salt;
(b) then dissolving said cobalt-II salt; and
(c) then adding ammonium hydroxide (ammonia).

39. The process of claim 36 wherein said aqueous reaction solution is prepared by reacting said cobalt-II salt with said ammonium salt and ammonium hydroxide (ammonia), wherein the molar ratio of ammonium salt to cobalt salt is about 8 to 1 to 14.7 to 1.

40. The process of claim 36 wherein said aqueous reaction solution has a pH of about 7.5 to 9.5.

41. The process of claim 36 wherein said aqueous reaction solution has a temperature of about 68° F. to 150° F.

42. The process of claim 36 wherein said substrate is contacted with said aqueous reaction solution for a time of about 3 minutes to 60 minutes.

43. The process of claim 36 comprising the additional step of contacting for a minimum time of 3 minutes said substrate having said cobalt conversion coating with an aqueous silicate solution comprising a silicate selected from the group consisting of sodium meta-silicate and potassium meta-silicate, wherein said silicate has a concentration of about 0.28–0.35 moles per gallon of said aqueous silicate solution and said aqueous silicate solution has a temperature of 120°–140° F.

44. A process for forming an oxide film cobalt conversion coating exhibiting corrosion resistance and paint adhesion properties on a metal substrate, wherein said substrate is selected from the group consisting of aluminum, aluminum alloy, Cd plating, Zn plating, Zn-Ni plating, and steel, said process comprising the steps of:
  (a) providing an oxide film forming cobalt conversion solution comprising an aqueous reaction solution prepared by reacting
    (1) a cobalt-II salt $CoX_2$, where X is selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
    (2) an ammonium salt $NH_4X$, where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$, and
    (3) ammonium hydroxide (ammonia),
  such that the concentration of said cobalt-II salt is from about 0.1 mole per liter of said aqueous reaction solution up to the saturation limit of said cobalt-II salt, the concentration of said ammonium salt is from about 0.6 to 12 moles per gallon of said aqueous reaction solution, and the concentration of said ammonium hydroxide (ammonia) is from about 1 to 8 moles per gallon of said aqueous reaction solution; and
  (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

45. The process of claim 44 wherein air is passed through said aqueous reaction solution to oxidize the cobalt-II ions in solution to cobalt-III ions.

46. The process of claim 44 wherein said aqueous reaction solution is prepared by a bath makeup sequence comprising:
  (a) dissolving said ammonium salt;
  (b) then dissolving said cobalt-II salt; and
  (c) then adding ammonium hydroxide (ammonia).

47. The process of claim 44 wherein said aqueous reaction solution is prepared by reacting said cobalt-II salt with said ammonium salt and ammonium hydroxide (ammonia), wherein the molar ratio of ammonium salt to cobalt salt is about 8 to 1 to 14.7 to 1.

48. The process of claim 44 wherein said aqueous reaction solution has a pH of about 7.5 to 9.5.

49. The process of claim 44 wherein said aqueous reaction solution has a temperature of about 68° F. to 150° F.

50. The process of claim 44 wherein said substrate is contacted with said aqueous reaction solution for a time of about 3 minutes to 60 minutes.

51. The process of claim 44 comprising the additional step of contacting for a minimum time of 3 minutes said substrate having said cobalt conversion coating with an aqueous silicate solution comprising a silicate selected from the group consisting of sodium meta-silicate and potassium meta-silicate, wherein said silicate has a concentration of about 0.28–0.35 moles per gallon of said aqueous silicate solution and said aqueous silicate solution has a temperature of 120°–140° F.

* * * * *